United States Patent [19]

Hallsten

[11] Patent Number: 5,050,361
[45] Date of Patent: Sep. 24, 1991

[54] DECK STRUCTURE

[75] Inventor: John Hallsten, Sacramento, Calif.

[73] Assignee: Hallsten Supply Company, Sacramento, Calif.

[21] Appl. No.: 291,768

[22] Filed: Dec. 29, 1988

[51] Int. Cl.⁵ ............................ F04B 1/38; B44D 5/08
[52] U.S. Cl. ........................................ 52/581; 52/180
[58] Field of Search ................. 52/588, 177, 180, 780, 52/594, 595, 579, 585, 586, 781

[56] References Cited

U.S. PATENT DOCUMENTS

| | | | |
|---|---|---|---|
| 2,926,928 | 3/1960 | Bennett | 52/588 |
| 3,172,508 | 3/1965 | Doering et al. | 52/586 |
| 3,236,017 | 2/1966 | Doering | 52/579 |
| 3,319,543 | 5/1965 | Braeuninger et al. | 52/588 |
| 3,460,304 | 8/1969 | Braeuninger et al. | 52/594 |
| 3,487,756 | 1/1970 | Glaza et al. | 52/579 |
| 3,784,312 | 1/1979 | Gordon | 52/586 |
| 3,840,908 | 10/1974 | Greene | 52/588 |
| 4,266,381 | 5/1981 | Deller | 52/177 |
| 4,599,842 | 7/1986 | Counihan | 52/586 |

Primary Examiner—Richard E. Chilcot, Jr.
Assistant Examiner—Michele A. VanPatten
Attorney, Agent, or Firm—Thomas M. Freiburger

[57] ABSTRACT

A deck structure primarily of aluminum members is assembled in modular panels, with each panel formed of a series of edge to edge deck planks connected into cross members at each end of the planks. Panels are connected lengthwise by interconnection of cross members at the ends of adjacent panels. In a preferred embodiment the cross members are connected by an interengaging flanges, and a plastic wedge is forced between the cross members to prevent disconnection. Preferably no welds are used in assembly of the aluminum frame structure, and the weldless deck structure has very good resistance to cyclical stresses particularly in a marine environment. Another important feature is that the panel framing members actually become structural supporting members in the assembled deck.

9 Claims, 5 Drawing Sheets

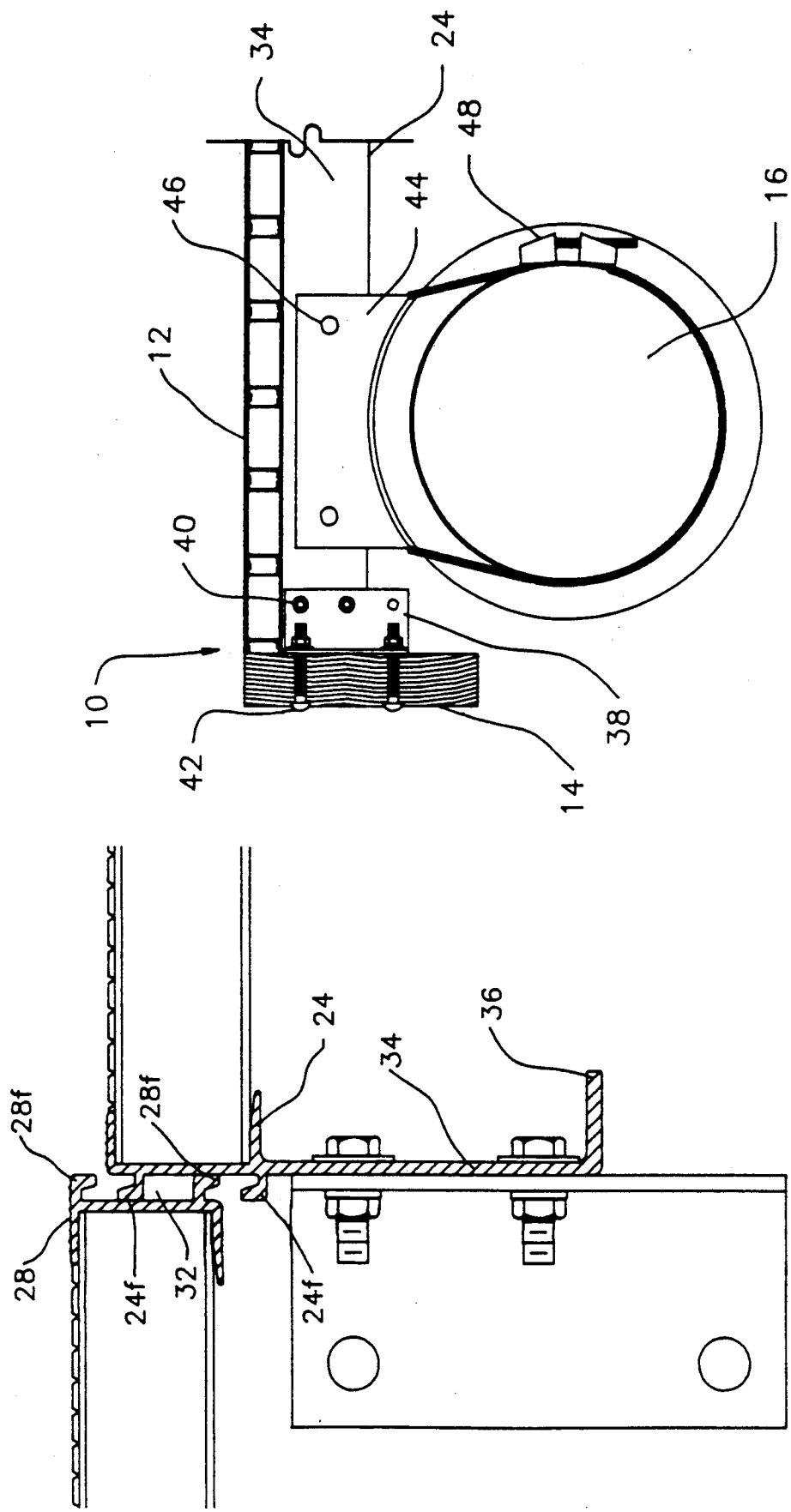

DECK STRUCTURE

BACKGROUND OF THE INVENTION

The invention relates to load-carrying deck structures, and in particular to a deck structure of advantageous construction whereby framing members of modular deck panels serve as structural members in the assembled deck. In a particular embodiment, the invention is concerned with decks for marine environments, such as floating docks which are subjected to cyclical movements and stresses, and to a system for interconnecting deck planks and the modular panels without any welds.

Docks and other deck structures have often been formed of aluminum, particularly aluminum extrusions assembled together. Typically alluminum slats ran the full length of the structure, with transverse structural members underneath the slats a appropriate spacings. The assembly has conventionally been by welding. However, in many cases the welding is not reliable over time, since repeated stresses will form cracks and eventually failures in the welds. This is especially true in marine environments, where docks, ramps, gangplanks and other such structures are always subjected to the cyclical movements and stresses associated with the movements of the water surface.

It is an object of the present invention to overcome the problems of weld failures due to cyclical stresses in metal deck and dock structures, and to provide simple, modular-type deck structures formed of panel modules which are very efficiently built and assembled to each other, without welds.

SUMMARY OF THE INVENTION

In deck structures according to the present invention, a deck is made up of a series of assembled panels or panel modules, principally by connecting the panel modules lengthwise. When connected together, the panel modules gain structural strength, since framing members of each panel actually become structural members when the panels are connected.

In principal embodiments of the invention the deck structure comprises a non-welded aluminum structure. Welds are completely avoided in the metal framing and interconnection between panels, and the assembled structure preferably also has a very low number of riveted or bolted connections. The main connection between ends of adjacent panels is made by interengaging flanges at the forward end of one panel and rearward end of the next panel, the interengaging flanges being on the opposed faces of cross members at the ends of the panels. Once interengaged, these cross member flanges may be locked together against disengagement by wedges driven into the space formed between the cross members.

Each deck panel or panel module is made up of a series of parallel, edge to edge deck planks, which preferably are interlocked along their edges so that they act together in resisting load stresses placed on the planks. The deck planks may be aluminum extrusions, with tongue-in-groove interlocks, or the deck planks can be suitable wooden members or other types of metal or even reinforced plastic members. In any event, the ends of the deck planks, at the forward and rearward ends of the panel, are inserted in channels of the cross members at the forward and rearward ends, thereby framing the planks into the panel module.

Preferably, the cross members are of two different types, a first type with a pair of outwardly and downwardly hooking flanges and the second with a pair of outwardly and upwardly hooking flanges, so that the two types of flanges hook and interlock together upon assembly. Also, one type of flange may be of a much deeper cross section, to provide most of the structural strength of the interlocked pair of cross members, for resisting spanning loads placed on the panels.

At the sides of the deck structure are side members which connect to the transverse cross members so as to hold the series of deck planks together and prevent lateral movement or separation of the deck planks. The side members also serve to fix the positions of the cross members at each end of a panel, preventing the panel from falling apart and disengaging the planks from the channels.

The side members or side boards can comprise metal extrusions connected by brackets to the transverse cross members, or they can comprise softer wooden members such as for use in a floating dock subject to bumping by boat hulls. In either event, the side members serve the dual purposes of captivating the deck planks with respect to lateral movement and holding the assembled deck structure together from cross member to cross member so as to prevent the deck planks from longitudinally separating from the transverse cross members.

In a preferred embodiment of the invention, the transverse cross members are of a deeper, structural cross section at one end of each panel, while being little more than a frame member at the opposite end of the panel. Thus, cross members with downwardly oriented interlocking flanges can be of one depth while the cross members with the upwardly oriented flanges can be of the other depth. In this way, in the assembled deck structure each connection between adjacent cross members includes a member of shallow cross section and a member of deeper cross section. The deeper cross section member gives the united pair of cross members most of its structure flexure strength for supporting loads between its ends.

The system of the invention also lends itself to interconnection with other parts and accessories. For example, in a floating dock structure of considerable length, several series of interconnected panels or decks should be hinged together to constitute the long dock structure. This accommodates wave motions which would tend to put high stresses on a long dock rigidly constructed.

In floating docks made up of the deck structure of the invention, pontoon floats are retained underneath the deck structure by saddle members or bearing members which connect to the structural cross members.

With the system of the invention fabrication time for a deck structure can be reduced by about 50%. Unskilled can easily fabricate the deck. The components can be packed very compactly for shipping.

It is therefore among the objects of the present invention to provide an improved deck structure having extruded metal frame components which, when a plurality of deck panels are assembled together, become structural components for bearing loads on the deck. A further object is to avoid, in preferred embodiments of the invention, the use of any welds between metal components by a versatile system of interfitting, modular parts, making the system particularly adaptable for the marine environment as a dock or ramp or gangplank. These and other objects, advantages and features of the invention will be apparent from the following description of preferred embodiments, considered along with the accompanying drawings.

DESCRIPTION OF THE DRAWINGS

FIG. 4 is an enlarged, exploded detail view in section showing the interconnection of a pair of transverse cross members on the modules or panels, and illustrating the manner in which a preferred weldless connection between the members is made.

FIG. 5 is a detail view in section, seen generally along the line 5—5 in FIG. 1 and illustrating connection of side members to the panels of the deck structure, as well as a connection to a float, for marine docks.

DESCRIPTION OF PREFERRED EMBODIMENTS

Figure 1:
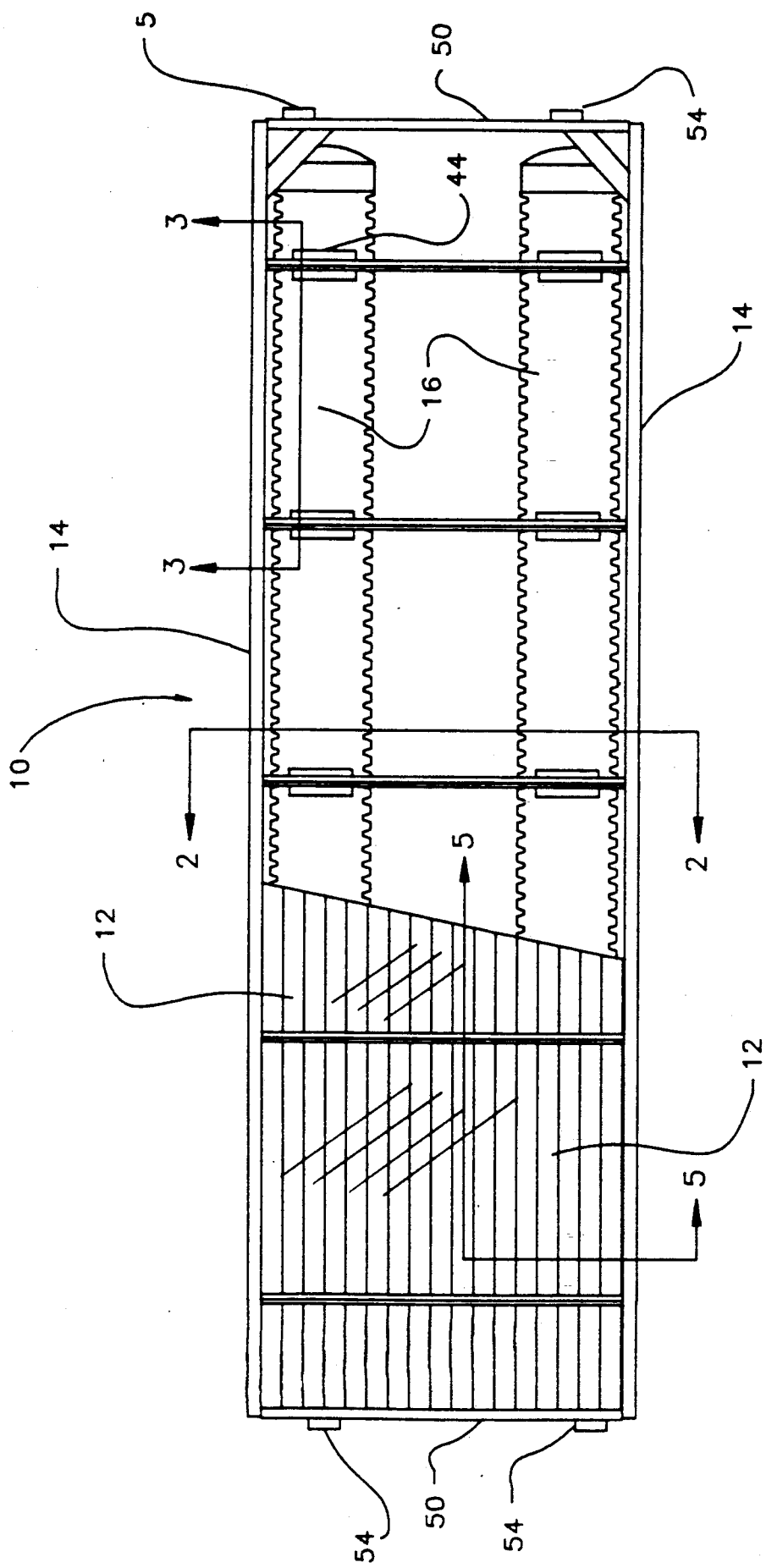
FIG. 1 is a plan view showing a modular deck structure made up of a plurality of modules or panels according to the invention. The deck is partially broken away, showing pontoons or floats, since in this example the deck structure serves as a dock.

In the drawings, FIG. 1 shows a deck structure 10 constructed in accordance with the principles of the invention. The assembled deck 10 is made up of a plurality of deck panels or modules 12, which are connected by their forward and rearward ends, preferably by a special form of connection. In one aspect of the invention, welds are totally avoided in the assembled deck structure 10.

In the illustrated embodiments, the deck structure 10 is in the form of a floating dock for marine use. In such a marine environment, wherein the dock is subjected to cyclical stresses due to motion of the water surface, the avoidance of welds is particularly important. Aluminum welds are subject to fatigue failure with such cyclical stresses. However, the deck structure can also form a ramp or gangplank, a scaffolding or virtually any other type of floor or deck structure, whether it be a permanent installation or temporary.

As shown in FIG. 1, the assembled deck structure 10 includes side members 14 preferably running the length of the assembled series of panels 12 and interconnecting them together. These left and right side or edge members may comprise wooden members (e.g., fir, redwood or cedar) for the marine application wherein boats may be tying up alongside the dock. For other applications, the longitudinal side members 14 may comprise aluminum or other metal extrusions, for example.

FIG. 1 also indicates, in a broken away portion, pontoons or floats 16 beneath the surface of the assembled deck structure 10. These preferably extend the full length of the series of panels as indicated, and are engaged by the deck structure in a manner described below.

Figure 2:
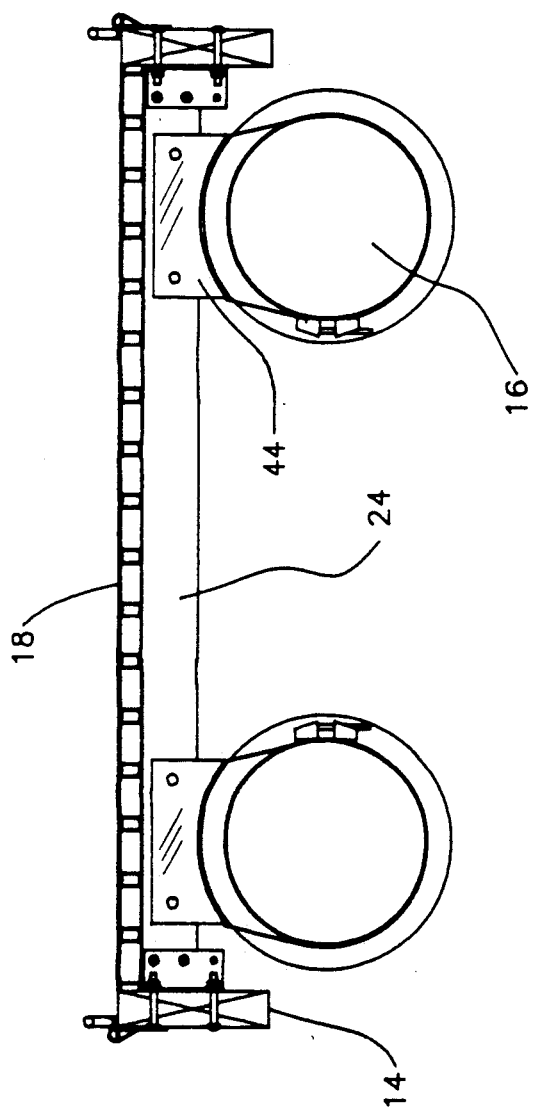
FIG. 2 is a transverse cross sectional view through a panel or module of the deck structure of the invention, as generally seen along the line 2—2 in FIG. 1.
Figure 2A:
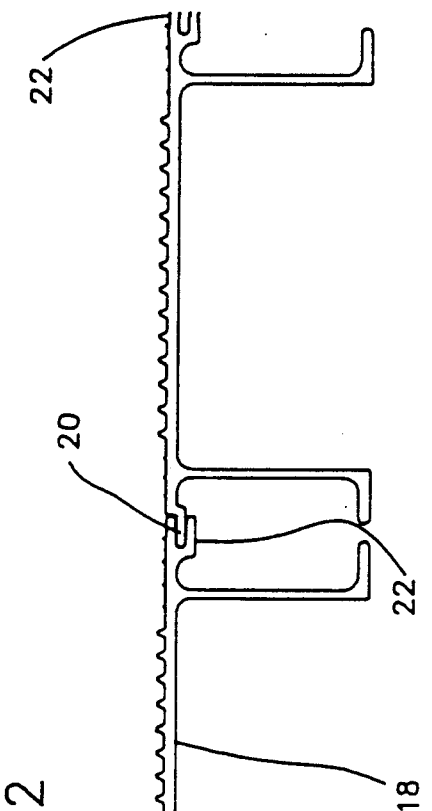
FIG. 2A is an enlarged view of a portion of FIG. 2.
Figure 2B:
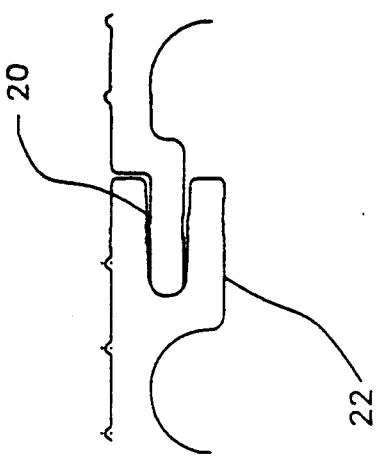
FIG. 2B is an enlarged view of a portion of FIG. 2A.

FIG. 2 shows the deck structure 10 in transverse cross section, showing one of the deck panels or modules 12 and also showing the longitudinal side members 14 at the edges of the panel 12. The panel 12 has a series of deck slats or planks 18 which are positioned edge-to-edge as shown, and which preferably are interlocked in some way. In preferred embodiments of the invention, the deck planks comprise aluminum extrusions, and these may be interlocked by tongue-in-groove configuration as shown. One side of each deck plank has a tongue 20 (see FIG. 2A and FIG. 2B), while the other side has a groove 22 for receiving the tongue of the adjacent plank. However, the deck planks 18 can also be wooden planks such as 2×4s or 2×6s, still preferably interconnected at some appropriate interval length, so that adjacent groups of planks act together in supporting bending loads on the deck.

FIG. 2 also shows a transverse cross member 24 at one end of the illustrated panel or module 12, into which the ends of the deck planks 18 are received. This is better seen in FIG. 3, a longitudinal cross section. The cross member 24, preferably an aluminum extrusion, has a channel 26 defined by upper and lower channel flanges 26a and 26b, and ends 18a of the planks are closely received in this channel. A cross member 28 of an adjacent deck module has a similar channel 26, and is connected to the cross member 24 as explained below.

Figure 3:
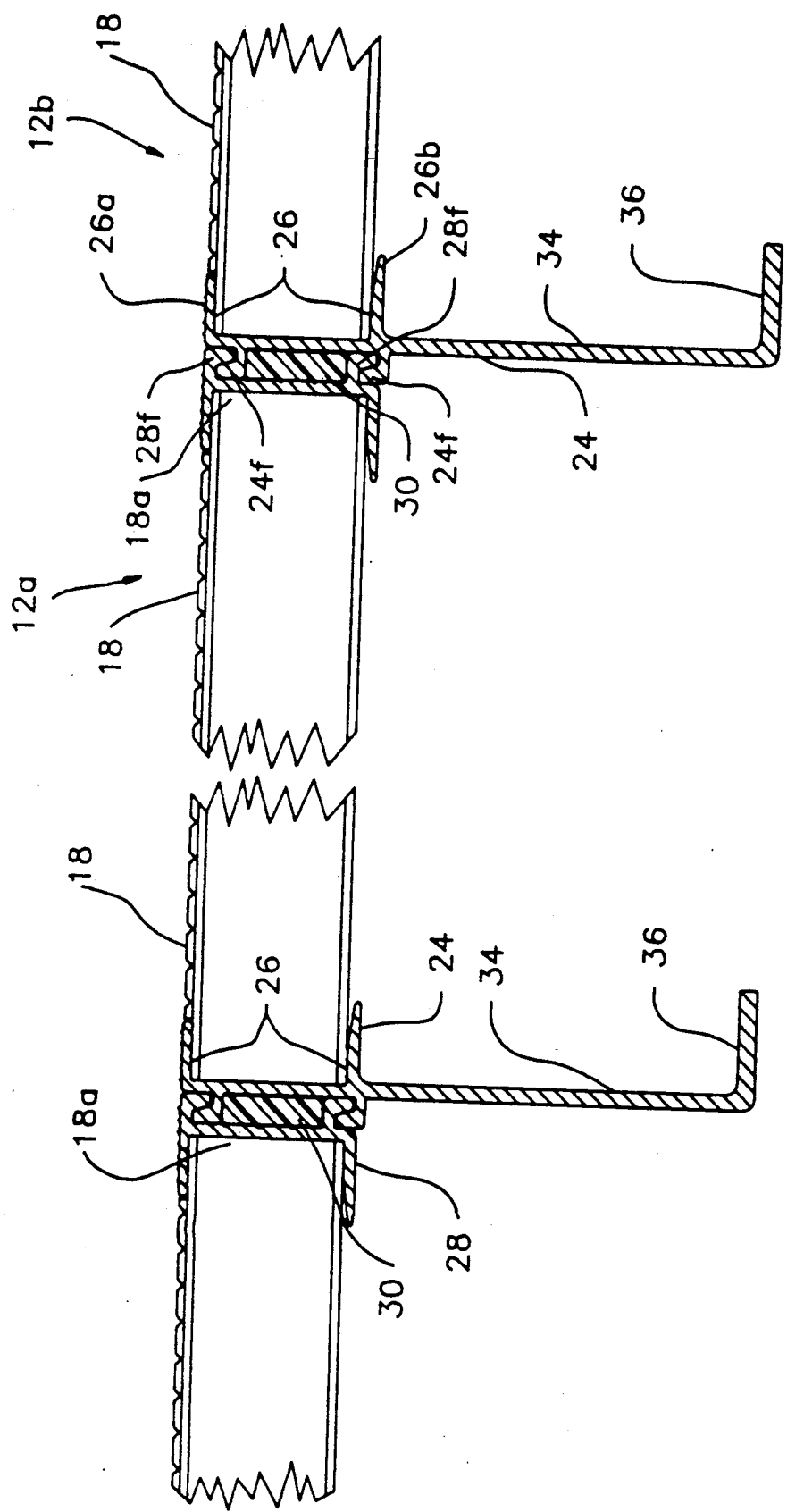
FIG. 3 is a partially broken enlarged longitudinal cross sectional view through the assembled deck structure as seen generally along the line 3—3 in FIG. 1.

FIGS. 3 and 4 show a preferred structure for interconnection of two adjacent cross members, at the forward end of one deck panel 12a and at the rearward end of an adjacent panel 12b. This connection structure is best seen with reference to the exploded detail view of FIG. 4, along with FIG. 3.

FIG. 4 shows that the two cross members 24 and 28 preferably are interconnected by L-shaped flanges 24f and 28f which are configured and oriented so as to interlock together when the two cross members are placed in proximity and then moved up/down with respect to each other. The forward end cross member 28, seen on the left in FIG. 4, has a pair of outwardly and downwardly hooking flanges 28f, while the other cross member 24, seen on the right in FIG. 4, has a pair of outwardly and upwardly hooking flanges 24F. The shapes of these flanges, which are formed in the extrusion process, are such that when the two cross members are brought together with the left cross member 28 at a slightly higher level than the right 24, so that the upper L-shaped flanges 24f and 28f clear each other, the cross members can be moved relative to each other so that the two are brought to the same level with upper surfaces flush. This closely locks the hooked or L-shaped flanges together, and they will not again separate unless they are shifted up/down with respect to each other. To prevent this from occurring, in a preferred embodiment a wedge member 30 which substantially fills the rectangular space 32 formed between the cross members and flanges, is driven into the space (see FIG. 3). In this way, the cross members are not permitted any up/down shifting movement relative to each other, and the two cross members and the panels with which they are associated are effectively locked.

If desired for temporary deck constructions such as scaffolds, the two adjacent cross members may be connected in such a way as to be later separable. This type of connection can be achieved using the wedge 30, provided it can be pulled or driven out of the inter-cross member space 32. Alternatively, the cross members can be connected using bolts or other fasteners, or simply by secure connection of each adjacent cross member 24 and 28 to the longitudinal side members 14, which will also prevent their relative up/down shifting for spans of relatively short length.

The drawings show the cross member 24 as a much deeper structural member than the connected cross member 28. The two sections are similar at their upper ends, but the cross member 24 has a lower structural extension comprising a web 34 and flange 36 which give it the strength to support loads spanning across the width of the deck module. This strength is imparted to the connected cross member 28, and to some extent the smaller member 28 adds its strength to the united pair of cross members, resisting loads together.

Both the members 24 and 28 could be deeper sections of equal depth if desired, and that depth could then be less than the depth of the illustrated member 24 since the two members act together. However, the dissimilar depths are preferred, so that only one member (24) of the pair needs the extended depth.

FIG. 5 shows in cross section further structural details of this preferred embodiment of the invention. The side member 14 may be secured to the panel modules by L-shaped brackets 38 which are bolted (or otherwise connected) to the web 34 of each deeper cross member 24. The brackets 38 are also bolted to the side member 14. Bolts 40 and 42 are shown in FIG. 5 for this purpose.

The side members 14 serve the purpose of holding the assembled deck structure together in the lengthwise direction (see FIG. 1) and thus these side members preferably are continuous through the length of the deck as shown in FIG. 1. This is subject to a length limitation for marine docks, generally between 20 and 30 feet, because of the undulating water surface, as discussed briefly above. The second purpose served by the side members 14 is to provide side retainers or abutments which hold the deck planks 12 in place against lateral, separating movements.

FIG. 5 also shows a pontoon or float 16 as retained under the deck structure 10 for the marine dock. The pontoon 16 may be formed of polyethylene, and it is retained by a pontoon saddle 44 which may likewise be polyethylene. The saddle 44, as illustrated in FIG. 5, may be retained under the deck by bolts 46 securing a vertical portion of the saddle 44 to the web 34 of the deeper cross member 24. These pontoon saddles 44 may occur at the location of each of the deeper cross members, as indicated in the cut-away portion of the plan view of FIG. 1. A nylon saddle strap and tightening assembly 48 may retain the pontoon tightly to the pontoon saddle 44.

Figure 6:
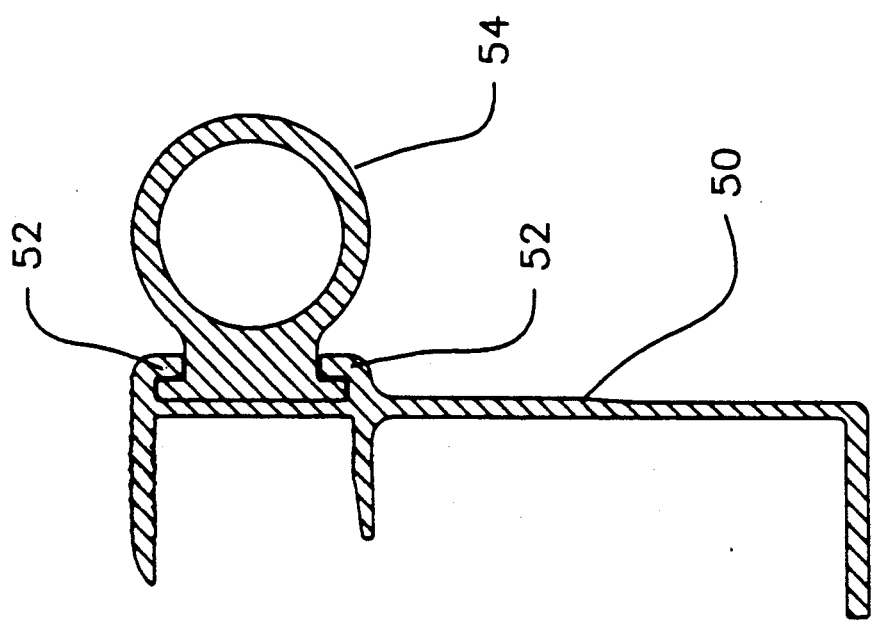
FIG. 6 is another detail view in section, illustrating a pivot or hinge connector which can be installed on an end one of the cross members, particularly when the deck structure is used as a floating dock.

FIG. 6 shows a special end cross member 50 which preferably is used at each end of an assembled, unitary deck structure 10. At the ends of the deck structure, the deck may be linked to another similar deck unit, particularly as a marine dock. Because of the limitation on length for such a rigid, floating structure, the units 10 may be linked together longitudinally by hinge or pin type connections. For this purpose the deep end cross member 50 has a pair of complementary lips or flanges 52 which allow a hinge segment 54 to be assembled into connection with the cross member 50 by sliding the one extrusion into the other. FIG. 1 shows four of these hinge segments 54, two at the right or leading end of the deck structure unit 10 and two at the left or trailing end as seen in the drawing. As indicated, the hinge segments 54 at the two ends are offset from each other, so that the right or leading end of one unit 10 can be connected to the left or trailing end of another unit 10. Connection may be made by a simple hinge pin (not shown) of sufficient length to connect the two opposed hinge segments together, with provision for preventing sliding of the hinge pin, such as collars on both ends of the hinge pin.

Figure 7:
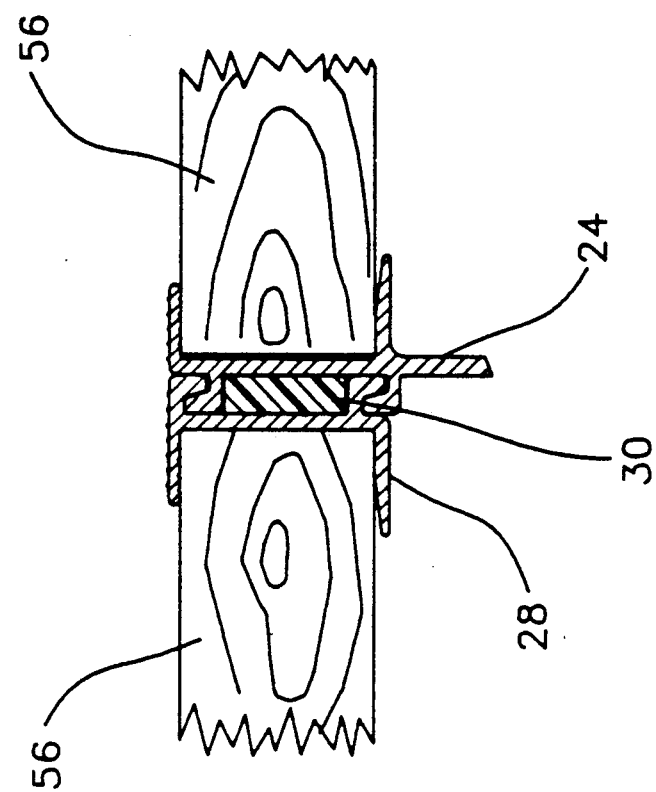
FIG. 7 is a fragmentary transverse cross sectional view similar to a portion of FIG. 3, but showing the use of a different type of deck planks in the assembled dock structure.

FIG. 7 is another detailed cross sectional view showing a pair of connected cross members 24 and 28 and a wedge 30 between the assembled cross members for preventing their separation. In FIG. 7 the deck planks are not aluminum extrusions, but rather wooden members such as 2×4s, 2×4s, etc. As discussed above, the wooden deck members may be used entirely in lieu of the aluminum extrusion deck planks, or they can be used only in certain areas for specific purposes. They preferably are interconnected along their side edges, so that they act together in resisting loads. Such connections may be with brackets, nails, screws etc.

The above described preferred embodiment is intended to illustrate the principles of the present invention, but not to limit the scope of the invention. Other embodiments and variations to these preferred embodiments will be apparent to those skilled in the art and may be made without departing from the scope of the invention as defined in the following claims.

I claim:

1. A weldless deck structure formed of a plurality of modular panels, comprising, a plurality of panels, each panel including a multiplicity of parallel, edge to edge planks, and a framing transverse cross member at each end of the multiplicity of deck planks, each transverse cross member extending across the width of all the deck planks, with a channel in each of the cross members receiving the ends of the deck planks, the deck planks being solely supported at their ends and said ends of the deck planks being secured to said channel without welds, and including means for preventing separation of the deck planks or lateral movement of the deck planks with respect to the cross members, at least one interconnecting means on the cross members, on the outside of the cross members opposite the channels, for engaging and interlocking the opposed outside faces of two adjacent cross members, so as to connect two adjacent panels together, the two interconnected, interlocked cross members forming structural beams having structural strength sufficient to support an intended load placed on the cross members and spanning generally between the ends of the cross members, with the cross members being unsupported except near their ends so as to span an unsupported distance via said structural beams while carrying loads applied to the deck planks, and locking means engaging the two interconnected cross members, for preventing disengagement of the cross members, the deck structure being entirely without welds.

2. The deck structure of claim 1, wherein the interlocking means of the cross members comprises a pair of spaced apart outwardly and downwardly hooking flanges on a first type cross member, and a pair of outwardly and upwardly hooking flanges on a second type cross member, positioned so that the cross members can be moved together with the first type cross member at a slightly higher level than the second type cross member so that the cross members are moved together with the two outwardly and downwardly hooking flanges above the two outwardly and upwardly hooking flanges, then the two cross members can be moved to the same level such that the flanges hook and interlock together, forming a space between the two cross members and between the interlocked flanges, and such that the two cross members will not disengage unless the first type cross member is again moved to a higher level than the second.

3. The deck structure of claim 2, further including a locking wedge inserted tightly in said space between the interlocked cross members, substantially filling the space such that the cross members are held tightly together and up/down shifting of the cross members with respect to each other is prevented.

4. The deck structure of claim 1, wherein the deck planks are connected together at their adjacent longitudinal edges so as to act together in resisting bending stresses from loading.

5. The deck structure of claim 4, wherein the deck planks comprise aluminum extrusions, and wherein each deck plank has a tongue along one edge and a groove along the opposite edge, so that the deck planks interlock in tongue-in-groove fashion.

6. The deck structure of claim 1, wherein the means for preventing separation of the deck planks comprises side members on each side of the panel, perpendicular to the cross members, extending substantially the length of the panel and being connected to the ends of the cross members.

7. The deck structure of claim 1 wherein the cross members and the planks are of aluminum.

8. A weldless deck structure according to claim 1, comprising a marine deck structure and including a pair of elongated floats spaced apart and positioned beneath the structural beams and parallel to said deck planks, the pair of elongated floats being located near the ends of the cross members and providing the sole support of said structural beams.

9. A deck structure without welds in structural connections, comprising,
a plurality of panels connected together end-to-end,
a series of deck slats forming each panel,
each panel having a cross member running transversely at each end with a slat receiving means in the end member,
and each cross member having means for interconnection with a cross member of an adjacent panel, with non-welded connection means for securing the cross members together.

* * * * *